Dec. 26, 1950      P. T. TUCKER      2,535,763
FLUID PRESSURE OPERATED DISK BRAKE
Filed July 29, 1946      2 Sheets-Sheet 1
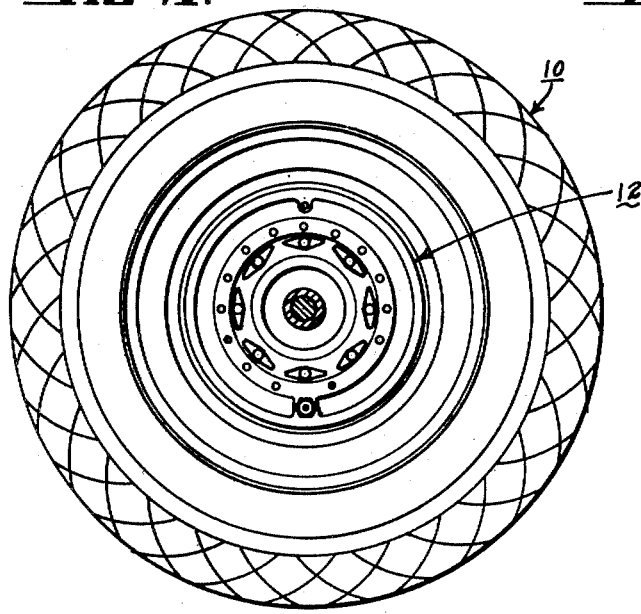
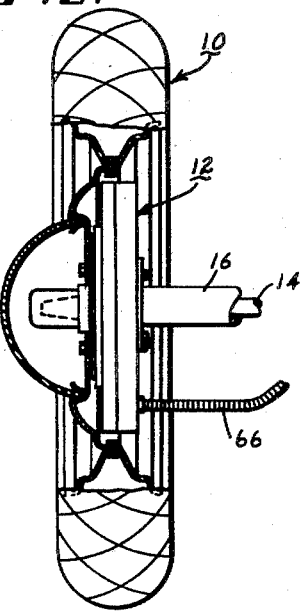
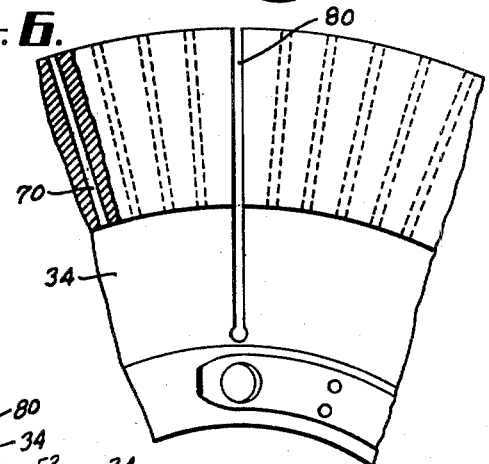
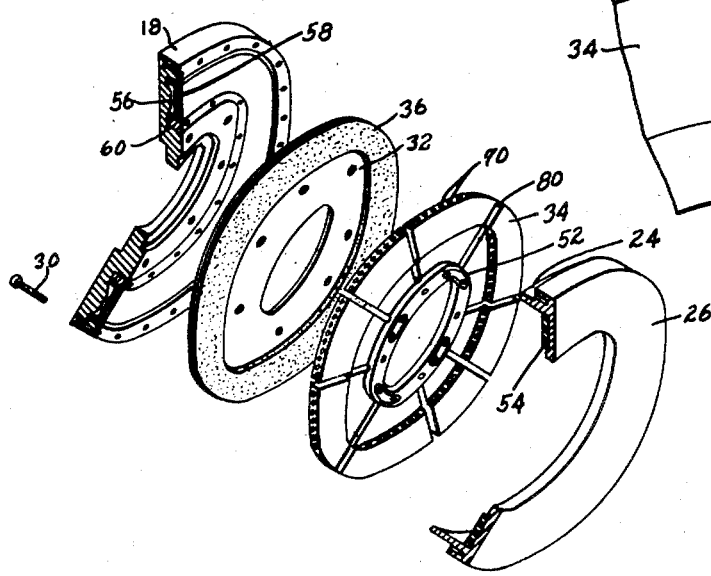
INVENTOR
PRESTON T. TUCKER
BY
Toulmin & Toulmin
ATTORNEYS Dec. 26, 1950         P. T. TUCKER         2,535,763
FLUID PRESSURE OPERATED DISK BRAKE
Filed July 29, 1946                        2 Sheets-Sheet 2
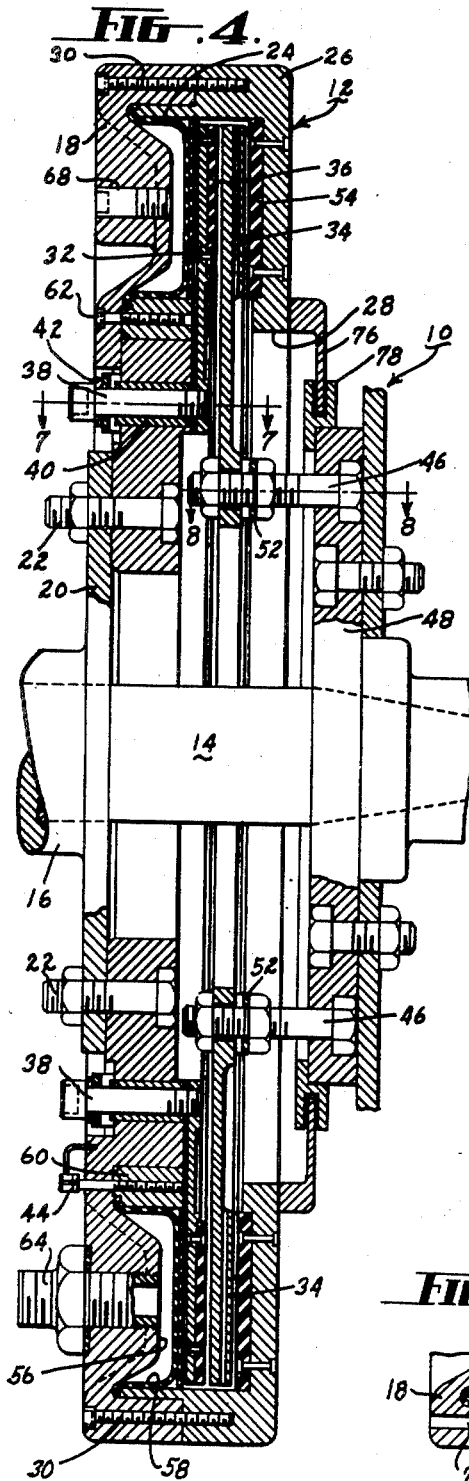
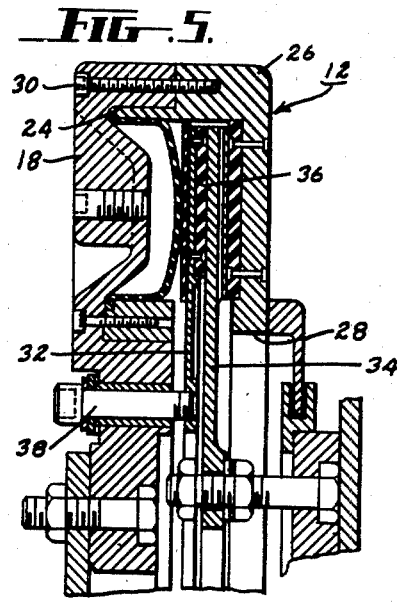
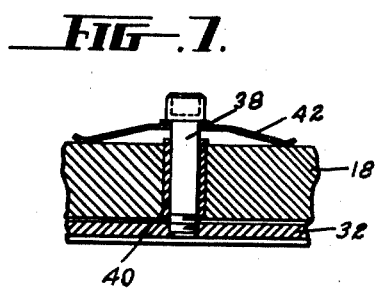
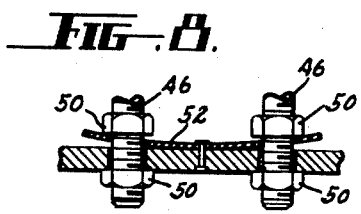
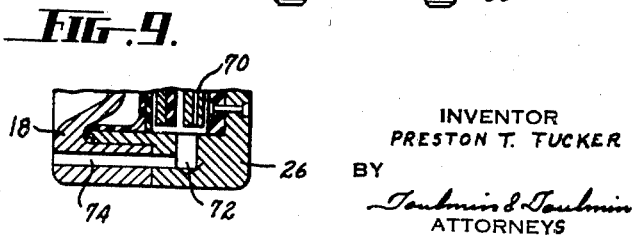
INVENTOR
PRESTON T. TUCKER
BY
*Toulmin & Toulmin*
ATTORNEYS Patented Dec. 26, 1950

2,535,763

UNITED STATES PATENT OFFICE 2,535,763

FLUID PRESSURE OPERATED DISK BRAKE

Preston T. Tucker, Ypsilanti, Mich., assignor to Tucker Corporation, Chicago, Ill., a corporation of Delaware Application July 29, 1946, Serial No. 686,893

3 Claims. (Cl. 188—152)

This invention relates to brakes and, particularly, brakes adapted to be used with automotive vehicles such as trucks, passenger automobiles and racing cars.

This invention has for its particular object the provision of a brake structure which has improved operating characteristics.

Another object of this invention is the provision of a brake structure which has an increased braking area.

Another object of this invention is to provide a brake for automobiles and the like which is lighter than brakes heretofore used.

Another object is to provide a brake for automobiles in which the braking member will not become warped or worn.

Still another object of this invention is to provide a brake structure which is self-cooling.

These and other objects and advantages will become more apparent upon reference to the accompanying drawings, in which:

Figure 1 is an elevational view of an automobile wheel equipped with the brake of this invention;

Figure 2 is a view of the automobile wheel of Figure 1 partly broken away and showing the brake attached;

Figure 3 is a perspective view, partly in section, of the brake of this invention;

Figure 4 is an enlarged vertical section showing the brake assembly in its non-braking position;

Figure 5 is a view similar to Figure 4 but showing the brake actuated and moved into effective braking position;

Figure 6 is a fragmentary elevational view showing the rotating friction plate of the brake;

Figure 7 is a fragmentary view showing the spring means associated with one of the movable braking surfaces and is indicated by the line 7—7 on Figure 4;

Figure 8 is a fragmentary view showing the springs associated with the friction plate for moving the same out of engagement with the adjacent braking surfaces and is indicated by the line 8—8 on Figure 4; and Figure 9 is a fragmentary view showing the cooling passages in the friction plate and the brake casing.

General arrangement

This invention, generally, comprises a friction disc adapted to be connected with a rotating member such as an automobile wheel. The friction disc is disposed between a pair of braking surfaces such as similarly shaped and lined discs. The lining of the last mentioned discs preferably comprises brake shoe material or clutch facing but it will be understood that any material capable of creating the necessary friction may be used.

A housing is provided for enclosing the aforementioned rotating disc and braking surfaces and constitutes a relatively flat cylinder member preferably divided into two portions.

One of the braking surfaces, that is, one of the lined surfaces may be integral with the housing while the other lined surface or friction disc is movable within the housing.

By suitable spring means the rotating disc and the braking surfaces with which it is adapted to be engaged are normally separated so that the said rotating disc may turn free within the brake housing.

While any suitable means may be provided for moving the braking members of this brake into operative engagement, it is preferred to employ fluid operable means which may comprise a rubber-like bag adapted to be expanded by fluid pressure so as to move the said members into effective relationship.

For the purpose of enhancing the utility of this invention for installations where the service is severe such as in the case of trucks or racing cars, cooling passages may be provided which create a circulation of air through the brake thus assisting in dissipating the excessive heat developed by prolonged or heavy braking loads.

Structural arrangement

Referring to the drawings more in detail, there is illustrated in Figures 1 and 2 an automobile wheel at 10 to which is attached the brake of this invention, the latter being generally indicated at 12. As shown, the brake may be applied to a power driven wheel having an axle 14 and an axle housing 16. It will be apparent, however, that the brake may also be applied to a non-driven wheel wherein the wheel is freely rotatable upon a stationary spindle.

The construction of the brake is more clearly shown in Figures 3 to 8, inclusive. The brake comprises a housing member 18 which is a drum shaped member adapted rigidly to be secured to the flange 20 of the axle housing 16 by suitable means such as the bolts 22. The member 18 is also adapted to receive the tenon 24 of the housing member 26.

The housing member 26 is a drum shaped member having an enlarged aperture as at 28 and is adapted to be secured to the member 18 by a plurality of screws 30.

Supported within the cavity enclosed by the members 18 and 26 are a pair of plates or discs indicated at 32 and 34. The disc 32 has attached on the face thereof adjacent the disc 34 brake lining or facing indicated at 36 which may be cemented or riveted to the disc 32 as desired.

The disc 32 has a plurality of threaded holes therein which receive the screws 38. The screws 38 pass through the anti-friction bearings 40 in the member 18 and are engaged by springs 42 as shown in Figure 7. The springs 42 serve to urge the screws 38 and, therefore, the disc 32 out of engagement with the disc member 34.

In order to stop the movement of the disc 32 when the same has been moved far enough to clear the disc 34, the adjustable stop screws 44 are provided which are adapted to abut and halt the said disc.

The disc member 34 is provided with a plurality of apertures which receive the screws 46 which may be recessed in the hub 48 of the wheel 10. The screws 46 have a pair of spaced nuts 50 thereon on either side of the disc 34. As indicated in Figure 8, a spring 52 is adapted to urge the disc 36 against the outer nuts 50 thus spacing the said disc from the lining or facing 54 of the casing member 26. The facing 54, similarly to the facing 36, is riveted or cemented to the housing member 26.

The housing member 18 is provided with a substantially annular cavity or recess at 56 which is adapted to receive a rubber-like channel member 58. The channel member 58 is engaged along the outer periphery thereof by the end of the tenon 24 which presses the said edge against the bottom of the recess 56 thus forming a liquid tight seal.

The inner periphery of the channel member 58 is also provided with a lip which is pressed against the bottom of the cavity 56 by an annular ring 60 which is held in position by a plurality of screws 62.

A suitable fitting such as at 64 is provided for the purpose of effecting fluid communication between a service line 66 and the recess 56. The service line 66 may lead to any suitable source of pressure fluid such as a master cylinder actuated by the brake pedal of an automobile.

In order to bleed off the air which may be trapped in the system, a plugged hole at 68 may be provided in the casing member 18.

In order to provide for a cooler operating brake, the disc 34 may have radial passages as at 70 therein which act, as the disc 34 rotates, as impellers for causing air to pass radially outward from the center of the casing to the outside. The casing member 26 and 18 may also be provided with the passages 72 and 74, respectively, which communicate with the atmosphere thus providing an exhaust for the heated air from the passages 70.

As indicated in Figures 4 and 5, the member 26 may carry the member 76 the edge of which is adapted to be received within a groove in the ring 78 carried by the hub 48. This arrangement is such that substantially no dirt or grit or moisture will gain access to the interior of the brake assembly.

The disc 34 may be a substantially solid member or may, as shown in Figure 6, be segmentally divided by a plurality of substantially radial slots as indicated at 80. The provision of the slots 80 permits the various portions of the disc 34 to yield, if necessary, more nearly perfectly to engage the linings 36 and 54.

In operation, the braking members normally occupy the position indicated in Figure 4. That is, the disc 34 is spaced from the facing 54 by the springs 52 while the facing 36 is spaced from the disc 34 by the springs 42.

In order to actuate the brake, pressure fluid is introduced into the cavity 56 through the fittings 64. This will expand the rubber-like channel member or bag 58 which presses the disc 32 against the disc 34 and thereafter moves the disc 34 against the facing 54. The conditions which then prevail are indicated in Figure 5.

It will be apparent from the foregoing description that this invention provides for a brake which is substantially lighter for any given braking arrangement than the conventional drum type brake. Likewise, the rotatable braking member 34 is less apt to warp or to wear out of true than is the drum shaped braking member of the usual type of braking device.

It will also be apparent that the provision of the cooling means of this invention increase the utility of the brake but make it possible to subject it to more severe and prolonged loading than is possible with other brakes.

Another feature of the present invention is the fact that the rotating part thereof is substantially lighter and more easily constructed and machined than the rotating parts of conventional brakes. By reason of this, the present brake is more economical to make and also lends itself readily to the balance which is necessary in automobile wheels, especially in racing cars.

It will be apparent that various modifications may be made in the structure of this invention without in any way departing from the spirit thereof. For example, the actuation of the disc 36 may be accomplished, if desired, by mechanical means rather than hydraulic without materially diminishing the advantages realized by this invention. Also, for ordinary service, the cooling passages 70, 72 and 74 could be eliminated without deleteriously effecting the operation of the brake.

Having thus fully described my invention, what I claim as new and desire to secure by Letters Patent is:

1. A wheel braking mechanism comprising a stationary housing, an axially slidable disc disposed concentrically within said housing and connected to the wheel for rotational movement therewith, frictional elements carried by said housing on each side of said disc for frictionally resisting rotational movement of said disc upon frictional engagement, one of said frictional elements being mounted for adjustment laterally relative to the housing, screws adjustable in said housing and extending beyond the inner side of the housing wall for limiting the movement of the adjustable frictional element away from the disc to its normal position of adjustment, spring means urging said latter frictional element against said stop, another spring means normally laterally spacing said disc from the frictional elements, and a fluid actuated diaphragm operating on the movable frictional element to bring the frictional elements and disc into frictional engagement against the forces of the spring means.

2. A wheel braking mechanism comprising a stationary housing, an axially slidable disc disposed concentrically within said housing and connected to the wheel for rotational movement therewith, frictional elements carried by said housing on each side of said disc for frictionally resisting rotational movement of said disc upon frictional engagement, one of said frictional elements being mounted for adjustment laterally relative to the housing, bolts extending slidably through the housing wall and carrying said one of the friction elements, springs acting between the bolts and the outer wall of the housing to urge said one of the friction elements toward the outer wall of the housing, stops in the housing to limit movement of said one of the friction elements toward the housing, other spring means normally laterally spacing said disc from the friction elements, and a fluid actuating diaphragm acting on said one of the friction elements to bring the friction elements and the disc into frictional engagement against the force of the spring means.

3. A wheel braking mechanism comprising a stationary housing, an axially slidable disc disposed concentrically within said housing and connected to the wheel for rotational movement therewith, frictional elements carried by said housing on each side of said disc for frictionally resisting rotational movement of said disc upon frictional engagement, one of said frictional elements being mounted for adjustment laterally relative to the housing, a stop in the housing to limit movement of the adjustable friction element away from the disc to its normal position of adjustment, spring means urging the adjustable friction element against the stop, bolts on which the disc is mounted, spaced apart nut members on the bolts between which the disc is positioned to define the extent of its axial movement, a fluid actuated diaphragm acting on the movable friction element to bring the friction elements and disc into frictional engagement, and a spring between the disc and the nut farthest from the diaphragm for normally spacing the disc from the friction elements.

PRESTON T. TUCKER.

REFERENCES CITED

The following references are of record in the file of this patent:

UNITED STATES PATENTS

| Number | Name | Date |
|---|---|---|
| 1,982,235 | Shepherd | Nov. 27, 1934 |
| 2,105,867 | Stewart | Jan. 18, 1938 |
| 2,238,943 | McCune | Apr. 22, 1941 |
| 2,354,385 | Lambert | July 25, 1944 |
| 2,370,360 | McLean et al. | Feb. 27, 1945 |